United States Patent Office 3,629,199
Patented Dec. 21, 1971

3,629,199
BENZALDEHYDE CROSSLINKED ALKYL
ARYL PHOSPHITE
Kenneth C. Petersen and Charles A. Blowers, Scotia,
N.Y., assignors to Schenectady Chemicals, Inc., Schenectady, N.Y.
No Drawing. Filed July 14, 1969, Ser. No. 841,595
Int. Cl. C08g 1/12, 5/00, 13/00
U.S. Cl. 260—53 R                                6 Claims

ABSTRACT OF THE DISCLOSURE

Resinous products are prepared by reacting benzaldehyde with a triaryl phosphite or a mixture of a triaryl phosphite with mono or diaryl phosphites and free phenol. The products are useful as antioxidants for polymers.

---

The present invention relates to novel phosphites and their use as antioxidants.

It is known to prepare reaction products of aryl phosphites and aliphatic or alicyclic aldehydes, Strauss Pat. 3,367,996. Such products have been proposed as stabilizers for a number of polymers. However, such antioxidants do not always enable the polymer to retain sufficient of its properties on heat aging.

It is an object of the present invention to prepare novel aryl phosphites.

Another object is to develop novel polymer compositions having improved stability.

A further object is to improve the heat aging properties of stabilized olefin polymers.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by reacting an aryl phosphite unsubstituted in at least one of the 2, 4 and 6 positions with benzaldehyde. The equivalent ratio of benzaldehyde to aryl phosphite can be from 0.1 to 1 to 3 to 1 but is usually not over 1.2 to 1. By equivalent ratio is meant the ratio of aldehyde groups to aryl groups. Thus, 1 mole of tris(butylphenyl) phosphite has three equivalents while 1 mole of di(butylphenyl) phosphite has two equivalents. Similarly 1 mole of di(butylphenyl) decyl phosphite has two equivalents.

Examples of aryl phosphites which can be used are triphenyl phosphite, diphenyl decyl phosphite, phenyl didecyl phosphite, tri(m-cresyl) phosphite, tri(o-cresyl) phosphite, tris(p-cresyl) phosphite, tris(p-cumylphenyl) phosphite, tri(p-butylphenyl) phosphite, tri(p-sec. butylphenyl) phosphite, tri(p-t-butylphenyl) phosphite, tri(o-t-butylphenyl) phosphite, tri(p-nonylphenyl) phosphite, tri(p-octylphenyl) phosphite, tri(p-isooctylphenyl) phosphite, tri(p-dodecylphenyl) phosphite, tri-(2,4-didodecylphenyl) phosphite, di(p-t-butylphenyl) phosphite, p-t-butylphenyl phosphite, tris(benzyl) phosphite, tri(p-t-amylphenyl phosphite, tri(p-propylphenyl)phosphite, di-(p-t-butylphenyl) phenyl phosphite, di(p-nonylphenyl) phenyl phospshite, tris(p-stearylphenyl) phosphite, tris-(2,4-di-t-butylphenyl) phosphite, tris(2,6-di-t-butylphenyl) phosphite, tris($\alpha$-naphthyl phosphite, tri($\beta$-naphthyl) phosphite. The preferred aryl phosphites are the butylphenyl phosphites, most preferably tris(p-t-butylphenyl) phosphite is employed. There can be used mixtures of phosphites. Such mixtures can be made either by blending preformed aryl phosphites or the mixture can be formed in situ, e.g. by incomplete reaction of $PCl_3$ with a phenol or by reacting $PCl_3$ with a plurality of phenols.

The aryl phosphites can be formed by any conventional method, e.g. by reacting $PCl_3$ with a phenol or by transesterifying triphenyl phosphite with an alkyl substituted phenol. When it is desired to form a triaryl phosphite (other than triphenyl phosphite) substantially free of mono or di substituted phosphites this is usually done by transesterifying triphenyl phosphite with the appropriate alkyl substituted phenol having a boiling point higher than phenol and removing the free phenol formed by distillation.

The reaction between the aryl phosphite and benzaldehyde can be catalyzed by either an acid or alkali, e.g. sulfuric acid, hydrochloric acid, phosphoric acid, p-toluenesulfonic acid, benzene sulfonic acid, oxalic acid, trichloroacetic acid, sodium hydroxide, potassium hydroxide, dimethyl aniline, triethylamine, tetramethyl ammonium hydroxide, cation and anion exchange resins, etc.

The aryl phosphite-benzaldehyde products of the present invention are useful as antioxidants and stabilizers for many materials, e.g. thus they can be used as antioxidants for mineral oil and other lubricating oils, for polyester urethanes and polyether urethanes, e.g. from toluene diisocyanate and glycerine-propylene adduct molecular weight 3000 or from toluene diisocyanate and ethylene glycol-propylene glycol adipate polymer; for polyesters, e.g. polyethylene terephthalate and polyethylene glycol adipate-maleate. They can also be used as antioxidants or stabilizers for halogen containing polymers such as chlorinated polyethylene, polychloroprene, polyvinyl bromide, polyvinylidene fluoride, polyvinyl fluoride, polyvinyl chloride and vinyl chloride copolymers, e.g. vinyl chloride-vinylacetate copolymer (87:13), vinyl chloride-vinylidene chloride (95:5), vinyl chloride-acrylonitrile (8:20) and for styrene polymers, e.g. polystyrene, rubber modified polystyrene (impact polystyrene).

The are particularly valuable with monoolefin and polyolefin polymers such as polyethylene, polypropylene, ethylene-propylene copolymers (e.g. 80:20, 50:50 or 20:80), ethylene-butene-1 copolymer, ethylene-pentene-1 copolymer, ethylene-hexene-1 copolymer, ethylene-decene-1 copolymer, polyisobutylene, butyl rubber (i.e. copolymers of isobutylene with a small amount of a diolefin, e.g. isobutylene-butadiene (98.5:1.5), as disclosed in Sparks Patent 2,356,128. The olefin polymers are normally solids having molecular weights of 10,000 to 1,000,000 or even higher.

They can also be used as antioxidants for EPDM rubbers.

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 54 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclo-octadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pats. 2,933,480; 3,000,866; 3,063,973; 3,093,620; 3,093,621, and 3,136,739, in British Pat. 880,904 and in Belgian Pat. 623,698.

Terpolymers and other EPDM rubbers from ethylene, propylene and dicyclopentadiene are exemplified in Tarney Pat. 3,000,866; Adamek Pat. 3,136,739 and Dunlop (British) Pat. 880,904. EPDM rubbers from ethylene, propylene and 1,4-hexadiene are exemplified in Gresham Pat. 2,933,480. As shown in Gresham, other suitable nonconjugated diolefins are 1,4-pentadiene; 2-methyl-1,5-hexadiene, 3,3-dimethyl-1, 5-hexadiene, 1,7-octadiene, 1,9-decadiene, 1,19-eicosadiene, 1,4-hexadiene, 1,9-octadecadiene, 6-methyl-1,5-heptadiene, 7-methyl - 1,6 - octadiene, 11-ethyl-1,11-tridecadiene.

EPDM rubbers from ethylene, propylene and 5-methylene-2-norbornene are exemplified in U.S. Pat. 3,093,-621. Suitable norbornadiene, e.g., 2-methyl norbornadiene, 2-ethyl norbornadiene, 2-n-heptyl norbornadiene are shown in Gladding Pat. 3,063,973 and bicyclo compounds such as bicyclo (2,2,2) heptadiene-2,5 are shown in Dunlop (British) Pat. 880,904. The use of cyclooctadiene-1,5 and other cyclodienes is shown in Montecatini (Belgium) Pat. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

They are particularly useful with polyolefin polymers including natural rubber, poly cis-isoprene, polybutadiene, poly 2,3-dimethyl butadiene-1,3, poly-2-chlorobutadiene-1,3, butadiene-styrene copolymer (SBR), butadiene-acrylonitrile copolymer (e.g. 75:25), butadiene-ethyl acrylate copolymer, acrylonitrile-butadiene - styrene copolymer (ABS).

The phosphite is used in an amount of 0.05 to 10% of the weight of the material being stabilized. There can also be included in the rubbery composition conventional rubber additives such as carbon black, zinc oxide, stearic acid, vulcanizing or cross-linking agents, e.g., sulfur and/or peroxides, e.g., dicumyl peroxide, dibenzoyl peroxide, di-t-butyl peroxide, cumene hydroperoxide, methylethyl ketone peroxide, t-butyl perbenzoate, fillers and pigments such as silica, calcium silicate, lignin, clay calcium carbonate, plasticizers or softeners, e.g., paraffinic oils such as Circo light oil, highly aromatic hydrocarbon oils such as Sundex 53, and naphthenic oils such as Circosol 2xH.

There can also be employed conventional accelerators such as mercaptobenzothiazole (MBT), tetramethylthiuram monosulfide (Monex), tetramethylthiuram disulfide (Tuads), zinc diethyl dithiocarbamate (Zimate), benzothiazyl disulfide, tellurium diethyl dithiocarbamate e.g., N,2 - dinitroso-N-methylaniline, 4,4'-bis(2-t-butylphenol) sulfide, 2,2'-methylenebis (6-t-butyl - 4 - methylphenol), N-phenyl-B-naphthylamine N-methyl-N,4-dinitrosoaniline.

The melting point of the tris(alkylphenyl) phosphite-benzaldehyde reaction products is dependent on the amount of benzaldehyde, generally with a given alkylphenyl phosphite the higher the amount of benzaldehyde, the higher the melting point (Ball and Ring).

Unless otherwise indicated, all parts and percentages are by weight.

EXAMPLE 1

To 156 grams of triphenyl phosphite (1.5 equivalents) was added 0.5 gram of concentrated sulfuric acid. Benzaldehyde, 159 grams (1.5 equivalents) was added beginning at 110° C. and raising the temperature during the addition to 190° C. The reactants were held for three hours and the temperature dropped to 105° C. due to refluxing water which was formed in the condensation reaction. The material was then stripped of water and distilled to 200° C. to yield a resin with a melting point (Ball and Ring) of 151° C.

EXAMPLE 2

A mixture of di-(p-t-butylphenyl) phosphite, tris-(p-t-butylphenyl) phosphite and mono-p-t-butylphenyl phosphite was prepared by gradually adding 1.0 mole of $PCl_3$ to 3.3 moles of p-t-butyl phenol at 100° C. The mixture was held for a few hours at 100° C. and then sparged with inert gas to purge out the residual hydrogen chloride.

The product contained 16.8% free p-t-butylphenol and 83.2% of a composite averaging di(butylphenyl) phosphite which was actually a mixture of di(butylphenyl) phosphite, tris(butylphenyl) phosphite and mono butylphenyl phosphite.

To 108 grams 0.67 equivalents of the above mixture (nominally tris(butylphenyl) phosphite) catalyzed with 5 drops of concentrated sulfuric acid was added 59.5 grams (0.56 equivalents) of benzaldehyde at a temperature range of 100–200° C. The temperature was then held for approximately four hours. The material was then distilled at 27 inches of vacuum to remove the water formed to yield 130 grams of a resin with a melting point (Ball and Ring) of 45° C.

EXAMPLE 3

To 200 grams of tris(dodecylphenyl) phosphite (0.75 equivalents) (prepared by reacting 3.3 equivalents of p-dodecylphenol containing approximately 15% of 2,4-di-dodecyl phenol with 1.0 mole of phosphorus trichloride) were added 12 drops of concentrated sulfuric acid. Benzaldehyde, 116 grams (1.09 equivalent), was then added and the temperature raised to 100° C. The temperature was brought to 160° C. and then the mixture was held under vacuum to remove water of condensation, yielding a resin with a melting point of 95° C.

EXAMPLE 4

The procedure of Example 2 was repeated replacing the impure tris(p-t-butylphenyl) phosphite with 0.67 equivalents of pure tris(p-t-butylphenyl) phosphite to obtain a solid resin.

The phosphite antioxidants prepared in Examples 1, 2 and 3 were tested in the following elastomer formulation for their ability to prevent oxidative degradation as measured in the test described below.

|  | Parts |
|---|---|
| Smoked sheet | 100 |
| EPC carbon black | 50 |
| Oil Co. | 5 |
| Zinc oxide | 5 |
| Stearic acid | 2 |
| Sulfur | 2 |
| N-cyclohexyl-2 benzothiazole sulfenamide | 1.3 |
| Diphenyl quanidine | 0.3 |
| Antioxidant | 1 |

Circo Light Rubber Process Oil (Parafinic Oil) Sun

For evaluating the elastomers compounded above there were prepared cured slabs according to ASTM D-15 procedure determining the optimum cure at 298° F. by testing tensile, elongation and modulus at 300 percent elongation according to ASTM D-412-66.

Dumbbell samples of optimum cured elastomer were then placed in a hot-air bath according to ASTM 865-62 and allowed to age for seven days at 158° F.

The aged samples were then removed from the air bath and were tested for retention of tensile and elongation according to ASTM D-412-66. A comparison was made between these values and the values for tensile, elongation and hardness for the unaged dumbbells.

In Table 1 below are the values obtained in the above tests using the Examples one through three, a control and two other antioxidants. All samples used one part of antioxidant except the control which contained no antioxidant.

TABLE 1.—ORIGINAL PROPERTIES

| Code | Tensile | Elongation | 300% modulus | Hardness |
|---|---|---|---|---|
| Example 1 | 2,900 | 470 | 1,520 | 63 |
| Example 2 | 3,210 | 500 | 1,400 | 67 |
| Example 3 | 2,440 | 400 | 1,550 | 61 |
| Control (no antioxidant) | 3,000 | 415 | 1,640 | 65 |
| Tris(nonylphenyl) phosphite-formaldehyde reaction product | 3,190 | 480 | 2,560 | 64 |
| 2,6-ditert butyl 4-methyl phenol | 3,340 | 430 | 2,140 | 66 |
| After ASTM 865-62 | | | | |
| Example 1 | 1,940 | 370 | 1,530 | 65 |
| Example 2 | 2,340 | 400 | 1,590 | 65 |
| Example 3 | 2,185 | 368 | 1,720 | 65 |
| Control (no antioxidant) | 1,850 | 320 | 1,825 | 68 |
| Tris(nonylphenyl) phosphite-formaldehyde reaction product | 2,060 | 270 | | 72 |
| 2,6-ditert butyl 4-methyl phenol | 2,530 | 390 | 1,870 | 68 |

There was also tested Example 2 at the one-half and two-part level based on 100 parts of the smoked sheet, using the same compounded rubber formula. Results were measured initially and after aging according to ASTM 865-62. The results are set forth in Table 2.

TABLE 2.—ONE-HALF PART OF ANTIOXIDANT OF EXAMPLE 2

| | Tensile, p.s.i. | Elongation, | 300% modulus, p.s.i. | Hardness |
|---|---|---|---|---|
| Original | 3,120 | 445 | 1,620 | 66 |
| After aging | 2,125 | 400 | 1,500 | 63 |
| Percent retention | 68 | 89 | | 96 |
| Two parts of antioxidant of Example 2 | | | | |
| Original | 3,498 | 480 | 1,880 | 65 |
| After aging | 3,694 | 470 | 2,155 | 67 |
| Percent retention | 106 | 98 | | 103 |

In order to evaluate the antioxidants of the application in SBR, there was tested the formulation below similarly to the tests performed on the smoked sheet masterbatch to yield the following results:

Formulation: Parts
SBR 1500 (23.5% bound styrene) _____ 100
HAF carbon black _____ 55
Circosol 2×4 (naphthenic process hydrocarbon oil) _____ 8
Zinc oxide _____ 3
Stearic acid _____ 1
Diphenyl guanidine _____ 0.3
N-cyclohexyl-2 benzothiazole sulfenamide ____ 1.2
Sulfur _____ 2
Antioxidant [1] _____ 1

[1] The product of Example 2; and as a control, a good commercial antioxidant, phenyl-beta-naphthyl amine. The results are set forth in Table 3.

TABLE 3

| Antioxidant | Cure temp., °F. | Cure time, min. | Tensile, p.s.i. | Elongation, percent | 300% modulus, p.s.i. | Tensile after ASTM 865-62, p.s.i. (7 days at 158° F.) | Elongation after 7 day at 158° F. after ASTM 865-62, percent |
|---|---|---|---|---|---|---|---|
| Example 2 | 308 | 60 | 3,290 | 425 | 2,350 | 3,059 | 280 |
| Phenyl beta naphthyl amine | 308 | 60 | 3,673 | 330 | 2,685 | 2,883 | 275 |

There was also evaluated the antioxidant of Example 2 in a non-black filled SBR stock. Following are the formulation and physical properties before and after aging at 158° F. for seven days (ASTM 865-62).

Formulation: Parts
SBR-1500 _____ 100
Dixie clay _____ 65
HiSil 233 (finely divided silica) _____ 30
Circosol 2x4 _____ 12
Zinc oxide _____ 3
Stearic acid _____ 1
Dipheny quanidine _____ 0.3
N-cyclohexyl-2-benzothiazole sulfenamide ____ 1.2
Sulfur _____ 2
Antioxidant _____ 1
Hexamethylene tetramine _____ 0.3

| Antioxidant | Cure temp., °F. | Cure time, min. | Tensile, p.s.i. | Elongation, percent | 300% modulus, p.s.i. | Tensile after ASTM 865-62, p.s.i. (7 days at 158° F.) | Elongation after 7 days at 158° F. after ASTM 865-62, percent |
|---|---|---|---|---|---|---|---|
| Example 2 | 308 | 30 | 1,551 | 590 | 564 | 1,450 | 520 |

It is evident that the physical properties are very well maintained after aging.

What is claimed is:

1. A phosphorus containing condensation reaction product of an aryl phosphite which is selected from the group consisting of triaryl phosphite, diaryl monodecyl phosphite and aryl didecyl phosphite, unsubstituted in at least one of the 2, 4 and 6 positions of the aryl group and benzaldehyde, the equivalent ratio of benzaldehyde to aryl phosphite being from 0.1 to 1 to 3 to 1.

2. A condensation product according to claim 1 which is a tris (alkylphenyl) phosphite having 4 to 12 carbon atoms in the alkyl group, the equivalent ratio of benzaldehyde to phosphite being not over 1.2 to 1.

3. A condensation product according to claim 1 wherein the phosphite is a phenyl phosphite or an alkylphenyl phosphite.

4. A condensation product according to claim 3 wherein the phosphite comprises a tris(alkylphenyl) phosphite having 4 to 12 carbon atoms in the alkyl group.

5. A condensation product according to claim 4 wherein the alkyl group has four carbon atoms.

6. A condensation product according to claim 5 wherein the phosphite is tris(p-t-butylphenyl) phosphite.

References Cited

UNITED STATES PATENTS 2,593,213  4/1952  Stiles _____ 260—970
3,367,996  2/1968  Strauss et al. _____ 260—887

SAMUEL L. BLECH, Primary Examiner

U.S. Cl. X.R.

252—49.8, 400; 260—3, 17.5, 33.6 AQ, 33.6 UA, 38, 41 R, 41 A, 41.5 RA, 45.7 P, 45.95, 67 R, 67 A, 838, 842, 843, 844, 845, 846, 847, 848

UNITED STATES PATENT OFFICE
CERTIFICATE OF CORRECTION

Patent No. 3,629,199    Dated December 21, 1971

Inventor(s) Kenneth C. Petersen et al

It is certified that error appears in the above-identified patent and that said Letters Patent are hereby corrected as shown below:

Col. 4, line 75, the entire line should be placed on Col. 4, line 68 before the word "Oil".

Signed and sealed this 13th day of June 1972.

(SEAL)
Attest:

EDWARD M. FLETCHER, JR.
Attesting Officer

ROBERT GOTTSCHALK
Commissioner of Patents